United States Patent
Hosier et al.

(10) Patent No.: US 6,445,413 B1
(45) Date of Patent: Sep. 3, 2002

(54) SYSTEM FOR DETERMINING A VIDEO OFFSET FROM DARK PHOTOSENSORS IN AN IMAGE SENSOR ARRAY

(75) Inventors: Paul A. Hosier, Rochester, NY (US); Scott L. Tewinkle, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/138,941

(22) Filed: Aug. 24, 1998

(51) Int. Cl.[7] .............................. H04N 9/64; H04N 5/08; H04N 5/335; H04N 5/228
(52) U.S. Cl. .................. 348/245; 348/241; 348/243; 348/245; 348/533; 348/607; 348/302; 348/304; 348/307; 348/222
(58) Field of Search .................... 348/245, 244, 348/241, 243, 533, 607, 302, 303, 304, 307, 222

(56) References Cited

U.S. PATENT DOCUMENTS

| | | | | |
|---|---|---|---|---|
| 4,649,430 A | * | 3/1987 | Hynecek | 348/245 |
| 5,047,861 A | * | 9/1991 | Houchin et al. | 348/247 |
| 5,162,735 A | * | 11/1992 | Okamoto | 330/253 |
| 5,231,503 A | * | 7/1993 | Nagatake et al. | 348/245 |
| 5,268,765 A | * | 12/1993 | Yamashita | 348/245 |
| 5,633,679 A | * | 5/1997 | Hosier et al. | 348/243 |
| 5,654,755 A | * | 8/1997 | Hosier | 348/245 |
| 6,118,115 A | * | 9/2000 | Kozuka et al. | 348/241 |
| 6,130,712 A | * | 10/2000 | Miyazaki et al. | 348/243 |
| 6,141,045 A | * | 10/2000 | Tewinkle et al. | 348/246 |

* cited by examiner

Primary Examiner—Wendy R. Garber
Assistant Examiner—John M. Villecco
(74) Attorney, Agent, or Firm—R. Hutter

(57) ABSTRACT

In a photosensitive device wherein voltages are read sequentially from a dark, or dummy, photosensor and a plurality of active photosensors with each of a series of scans, a circuit downstream of the photosensors resets the offset value of the voltage signals, based on successive voltage readings from the dark photosensor. An RC averaging circuit maintains a running average of readings from the dark photosensor over a large number of scans. Signals from the dark photosensors are read a first time into the averaging circuit, and then signals from the dark photosensors are read directly to downstream video circuitry. This double readout of dark-photosensor signals enables precise calibration of both on-chip circuitry and downstream video circuitry.

20 Claims, 6 Drawing Sheets

SYSTEM FOR DETERMINING A VIDEO OFFSET FROM DARK PHOTOSENSORS IN AN IMAGE SENSOR ARRAY

INCORPORATION BY REFERENCE

The present application incorporates by reference U.S. Pat. No. 5,654,755, assigned to the assignee hereof.

FIELD OF THE INVENTION

The present invention relates to image sensor arrays used in raster input scanners. In particular, the invention relates to photosensitive chips wherein each photosensor outputs signals onto a common video line, and where there are provided dark photosensors for setting an offset level on the common video line.

BACKGROUND OF THE INVENTION

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, a preferred design includes an array of photosensors of a width comparable to the width of a page being scanned, to permit one-to-one imaging without reductive optics. In order to provide such a "full-width" array, relatively large silicon structures must be used to define the large number of photosensors. A preferred technique to create such a large array is to make the array out of several butted silicon chips. In one proposed design, an array is intended to be made of 20 silicon chips, butted end-to-end, each chip having 248 active photosensors spaced at 400 photosensors per inch.

Although most scanning systems currently in use are ultimately digital systems, the "raw signal" coming out of the photosensors during the scanning process is an analog video signal, with the voltage magnitude corresponding to the intensity of light impinging on the photosensor at a given time. Thus, when signals are read out from the photosensors on a chip to be converted to digital data, different video levels, corresponding to the brightness of the reflected area being scanned by a particular photosensor at a particular moment, are output as a series of analog voltage levels.

Photosensitive devices may be one-dimensional or two-dimensional, and can be either of the "active" variety, wherein the photosensors output voltage signals, or in the form of a charge-coupled device, or CCD, which outputs a sequence of charges from a series of individual photosensors. In all of these various types of photosensitive devices, a common design feature is the use of "dark" photosensors, which are used to periodically reset the offset voltage for the photosensors being read out. These dark photosensors are of the same semiconductor structure as the other "active" photosensors on each chip, but the dark photosensors are not exposed to light. In most designs, the dark photosensors are provided with an opaque shield, such as of aluminum or silicon, to prevent the influence of light thereon. In the scanning process, with each readout cycle of active photosensors on each chip, the readout of the first photosensor is proceeded by readouts of one or more dark photosensors, which are used to reset the voltage offset associated with the whole chip, and thereby correct signal drift when the active photosensors are reading out their signals. In other words, the readout of a dark photosensor with each scan can serve as a reference offset or "zero point" so that the absolute values of light intensity on the active photosensors may be determined. The use of a dark photosensor output when reading out signals from active photosensors can significantly compensate for performance variations of multiple chips in a single apparatus, and also for changes in the performance of a photosensitive device over time.

DESCRIPTION OF THE PRIOR ART

U.S. Pat. No. 5,654,755 describes a circuit for correcting the offset of the video output of a set of active photosensors, based on the output of dark photosensors. An averaging RC circuit in parallel with the video line accumulates an average signal based on a large number of readings from the dark photosensors. The average signal is periodically clamped to a correction capacitor in series on the video line. The charged correction capacitor adjusts the offset on the active-photosensor signals which subsequently pass through the video line. In this context, the correction of the offset on active-photosensor signals is known as "DC restore."

While the system of the '755 patent works well from the perspective of correcting offset on an integrated photosensor chip, certain subtleties of operation must be addressed when such a chip is incorporated into a larger system. One problem is that the signals from the dark photosensors add to the fixed-pattern noise, or dark non-uniformity, of the video signals that must be processed. Dark photosensors should have the same drift characteristics as the active photosensors. In the case where dark photosensor signals are flushed straight through the video circuitry, the on-chip drift characteristic follows that of the drift of the photosensor circuitry in addition to the drift of the video amplifiers. However, the drift of the active photosensors does not reflect the drift of the circuitry since this is subtracted out during the DC restore operation. During the DC restore operation the video signal is restored to a dark reference level plus the active pixel level minus the averaged dark photosensor level. Since both the active photosensor level and the dark photosensor level have the same drift, this drift is cancelled out in the video signal. Therefore there exists a need to provide an offset-correction system for dark and active photosensors, which provides the offset correction from both the perspective of the on-chip photosensor circuitry, and also from the perspective of any downstream image circuitry.

SUMMARY OF THE INVENTION

According to the present invention, there is provided a photosensitive device and a method of operating thereof. The photosensitive device comprises a set of photosensors, each photosensor outputting a voltage signal representative of light intensity thereon. A video line is adapted to receive voltage signals from the set of photosensors. A correction capacitor is associated with the video line, the correction capacitor adapted to retain a correction charge thereon to influence the voltage signals from the photosensors. A bypass switch selectably causes the signal on the video line to bypass the correction capacitor. A signal is read from a photosensor a first time with the correction capacitor bypassed by the bypass switch and then a signal is read from the photosensor a second time through the correction capacitor.

According to another aspect of the present invention, there is provided a photosensitive device and method of operating thereof. The photosensitive device comprises a set of photosensors, each photosensor outputting a voltage signal representative of light intensity thereon. A video line is adapted to receive voltage signals from the set of photosensors. An averaging circuit is in parallel with the video line. Within a cycle of operation, a signal is read from a photosensor a first time, with reading a signal to the averaging circuit, and then a signal is read from the photosensor a second time, but the signal is not read to the averaging circuit.

DETAILED DESCRIPTION OF THE INVENTION

Figure 1:
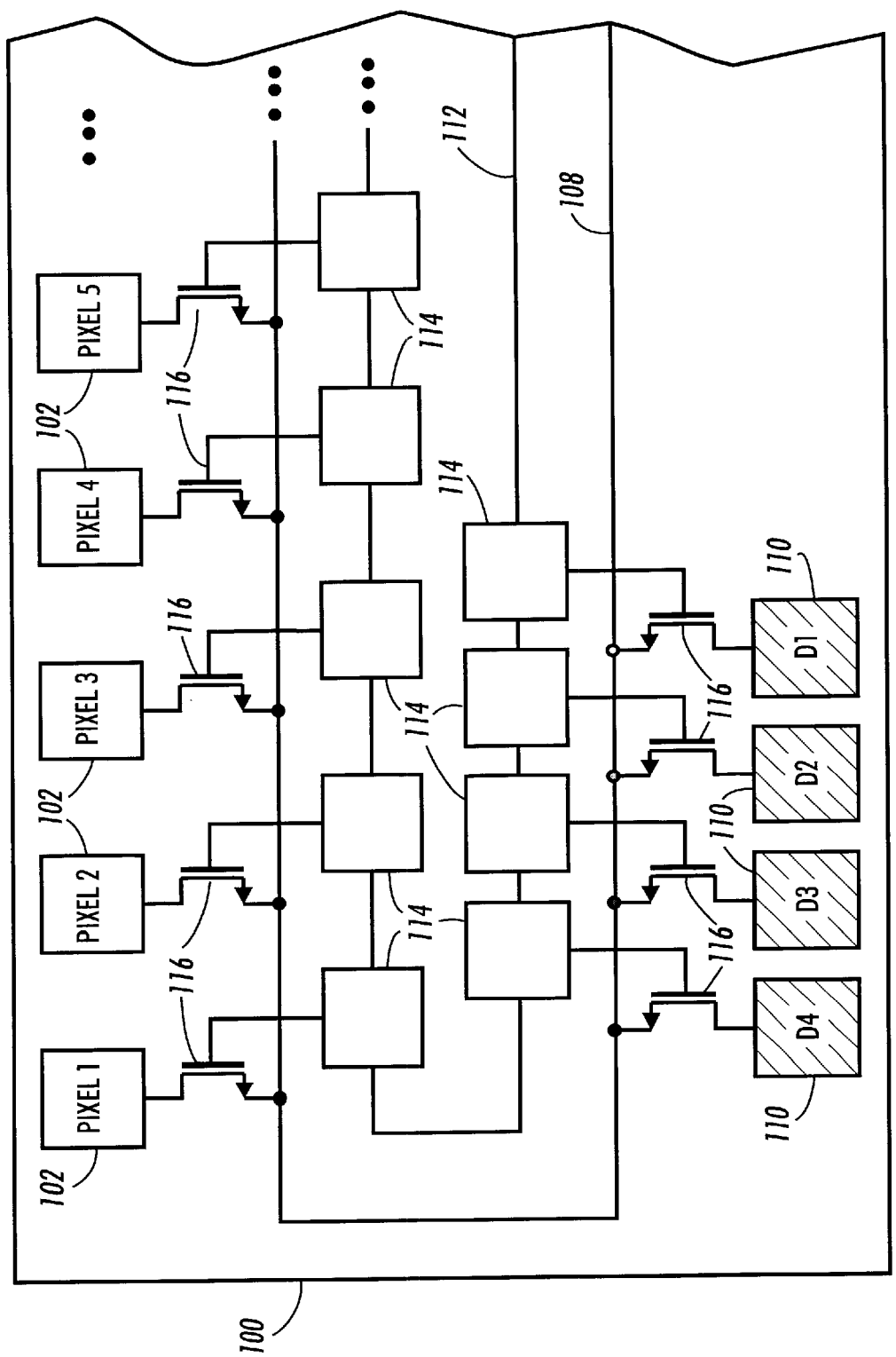
FIG. 1 is a plan view of the relevant portions of an active photosensitive device having dark photosensors and active photosensors reading to a common video line.

FIG. 1 is a simplified plan view showing a configuration of photosensors on a single active photosensor chip 10. Such a chip would be found, for example, in a raster input scanner (RIS) having a linear array of photosensors, as would be used, for example, in a digital copier or scanner. As is well known, such a chip can be exposed with a thin line of dark and light areas from an original hard-copy image; over time, the original hard-copy image is moved relative to the chip, so that each individual photosensor on the chip is exposed to a sequence of small areas on the original image. A typical raster input scanner may include a single chip which, in combination with reduction optics, is exposed to an entire width of a page being scanned; or alternately could include a plurality of such chips, butted end-to-end, which together form a single page-width linear array of photosensors.

In the plan view of FIG. 1, there is shown a long array of active (i.e., photosensitive) photosensors 102 which share a common video line 108 with a plurality of "dark photosensor" photosensors 110, which are individually indicated as D1–D4. Also associated with the photosensors 102 and 110 is a shift register line 112 which connects a series of shift register select switches 114. The shift register select switches 114 have associated therewith a series of transistor switches 116. When each transistor switch 116 is activated, the transistor switch permits the charge from its associated individual photosensor 102 or 110 to be readout through the switch 116 onto the common video line 108. There is thus run through the line of shift register switches 114 on line 112 digital information in the form of a string of 0's with a single "1" therein. As the string of digits moves through the shift register switches 114 along line 112, the single "1" activates the photosensors in a sequence as it moves down the input line 112, thereby causing the photosensors 108 and 102 to output the signals thereon, in order, onto video line 108.

In the particular design of FIG. 1, the first photosensors to be activated with each scan are the dark photosensors 110, followed by the active photosensors 102. As mentioned above, the dark photosensors 110 are typically of the same general structure as the active photosensors 102, except that they are not exposed to light in any way. Typically, the dark photosensors 110 are shielded from light, such as with a layer of aluminum. Because both the dark photosensor 110 and active photosensors 102 are created in the same chip, they will be as physically similar as possible, so that any systemic process variation or parasitic effect of the active photosensors 102 will be equally apparent in the dark photosensors 110. In this way, with each scan of video signals the dark photosensors in effect recalibrate the chip by establishing a video signal consistent with no light impinging on a photosensor. Once this offset is determined, systemic errors in the outputs of the active photosensors can be compensated for.

Figure 2:
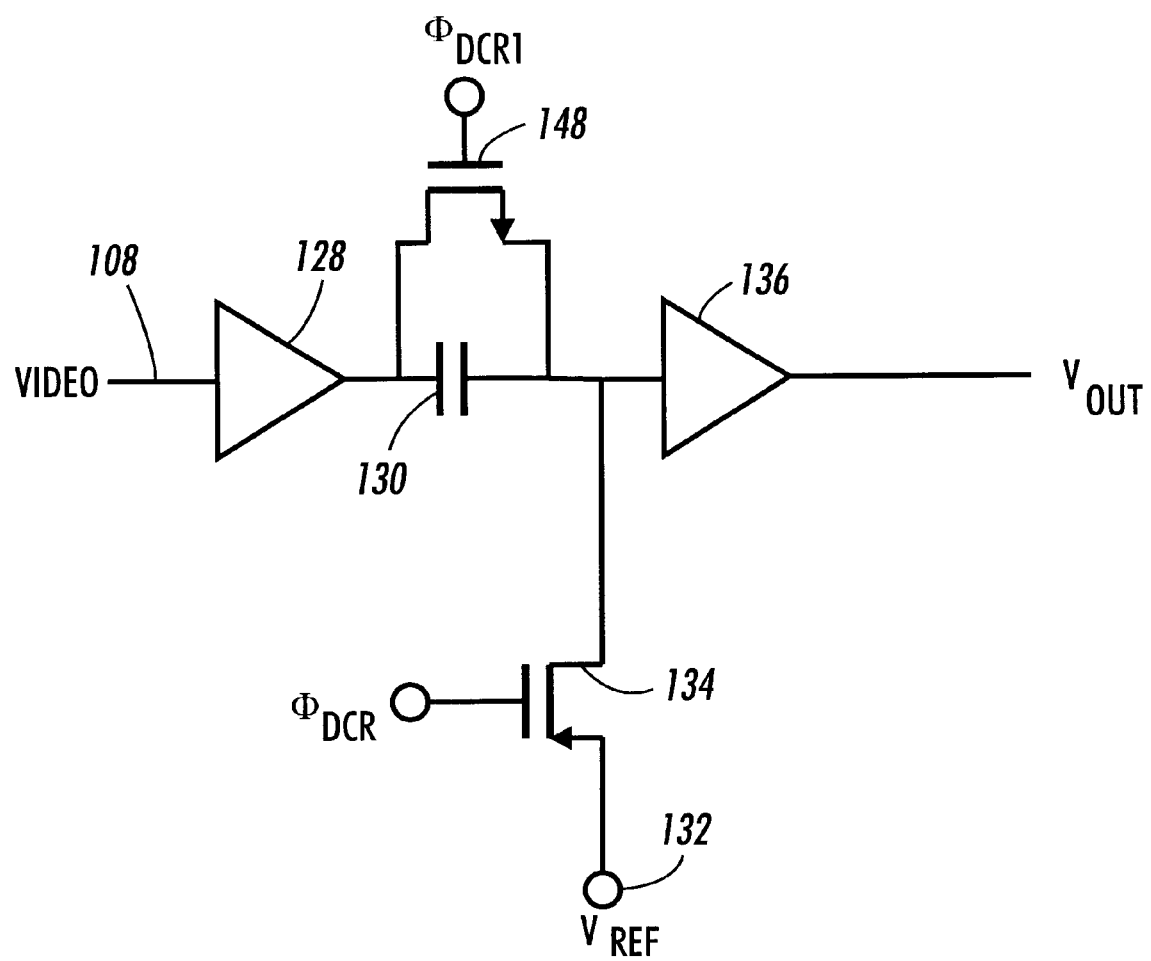
FIG. 2 is a schematic of a simple circuit for causing dark photosensor signals to determine an offset for subsequent active photosensor video signals.

A simple apparatus for carrying out the operation of causing the dark photosensors to determine the offset for the active photosensor which are subsequently read out on video line 108 is shown in FIG. 2. The circuit shown in FIG. 2 is intended to be immediately downstream of the active photosensors on video line 108. Following passage through a unity-gain amplifier 128, there is provided on video line 108 a capacitor 130, which will specifically be referred to as "correction capacitor" 130. Correction capacitor 130 retains a charge thereon which influences the magnitude of voltage signals from active photosensors which are read out through video line 108. Because of the relatively high speeds of reading out active photosensors with each scan, the charge on correction capacitor 130 will remain reasonably constant through every readout sequence. In order to place an original charge on correction capacitor 130, that is, a charge on correction capacitor 130 which will influence the magnitude of voltage signals in a desirable manner, the correction charge on correction capacitor 130 is fixed with every scan when the dark photosensors 116 are read through video line 108.

In a typical embodiment of a chip such as 100 with four dark photosensors 110, the selection of four dark photosensors is mandated mainly by standard engineering practice; typically, only one such dark photosensor, such as dark photosensor D3, is used to determine the offset for the subsequent readout of active photosensors. At the beginning of each readout, when it is the turn of dark photosensor D3 to output its dark photosensor signal onto video line 108, a reference voltage, from a source 132 in parallel to the video line 108, is activated, such as through a switch 134. The output of the dark photosensor D3 of dark photosensors 110, simultaneous with the application of reference voltage $V_{REF}$ on the other side of correction capacitor 130, has the effect of placing on correction capacitor 130 a charge, referred to as the "correction charge," representative of both the dark photosensor signal and $V_{REF}$. There may also be other circuits along video line 108, which are here summarized as the influence of an extra unity gain amplifier, indicated as 136.

As soon as dark photosensor D3 of dark photosensors 110 has output its dark signal onto video line 108 the transistor 134 goes low, shutting off $V_{REF}$ on video line 108, and leaving a residual correction charge on correction capacitor 130. Henceforth, for all subsequent signals on video line 108 until the next operation on dark photosensor D3, the output of $V_{OUT}$ on video line 108 is:

$$V_{OUT}=(V_n-V_{D3}+v_{na}+v_{nd})+V_{REF}+V_{OS}$$

where $V_n$=the output of an active photosensor n; $v_{na}$=active photosensor noise; $v_{nd}$=dark photosensor noise; $V_{D3}$=the voltage signal from dark photosensor 3; and $V_{OS}$=the offset contributed by other circuitry, symbolized by unity gain amplifier 136. The signal from dark photosensor 3 will, through correction capacitor 130, influence the magnitude of all voltage signals from the active photosensors 102 through the whole scan. In this FIG. 2 embodiment, the particular influence of $V_{D3}$ will last only until the next scan when dark photosensor D3 is again caused to set the charge on correction capacitor 130.

One practical problem with the simple implementation of FIG. 2, which has been identified as significant in high-precision scanners, is the influence of thermal noise on dark photosensor D3, which is symbolized in the above equation by $v_{nd}$. This thermal noise $v_{nd}$ may significantly change with each scan. The thermal noise on dark photosensor D3 has a pernicious influence, because the noise on dark photosensor D3 will ultimately influence the magnitude of the voltage signal from every single active photosensor in the scan, and may vary significantly from scan to scan. It is a purpose of the present invention to provide a system by which the influence of thermal or other noise on dark photosensors, which influence the offset voltage of the entire chip, is minimized.

Figure 3:
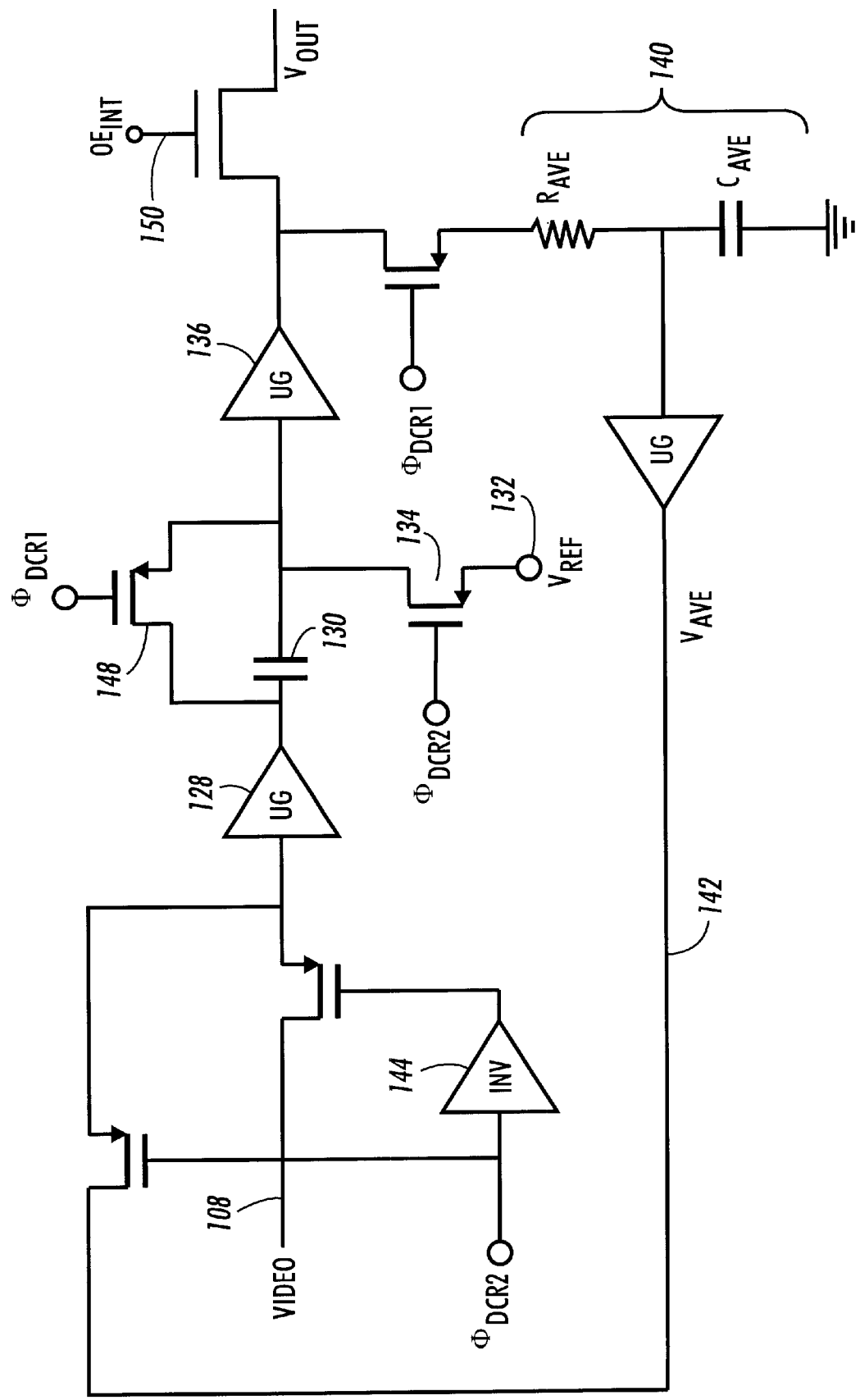
FIG. 3 is a schematic diagram of a circuit, according to a preferred embodiment of the present invention, showing a circuit for determining an offset for a video line from dark photosensor signals.

FIG. 3 is a schematic diagram of a simple embodiment of a dark photosensor offset circuit according to the present invention. It will be noted that the circuit of FIG. 3 shares key similarities with the simple circuit of FIG. 2: the circuit of FIG. 3 is disposed at the end of the video line 108, so as to receive signals from both the dark photosensors 110 and the active photosensors 102. There is also a unity gain amplifier 128, and correction capacitor 130 on the video line. As in the FIG. 2 circuit, a reference voltage $V_{REF}$ is available to the video line 108 through transistor 134.

A significant feature of the embodiment of FIG. 3 is an RC circuit, indicated as 140, in parallel with the video line 108. This RC, in turn, is connected through an average voltage line 142 (which may include a unity-gain amplifier as shown), to selectably apply an average voltage $V_{AVE}$ to the video line 108 when activated by switching means 144. There is also provided in the circuit of FIG. 3 a bypass switch 148, which, as shown, causes correction capacitor 130 to be bypassed on video line 108 when a voltage is applied thereto.

Figure 4:
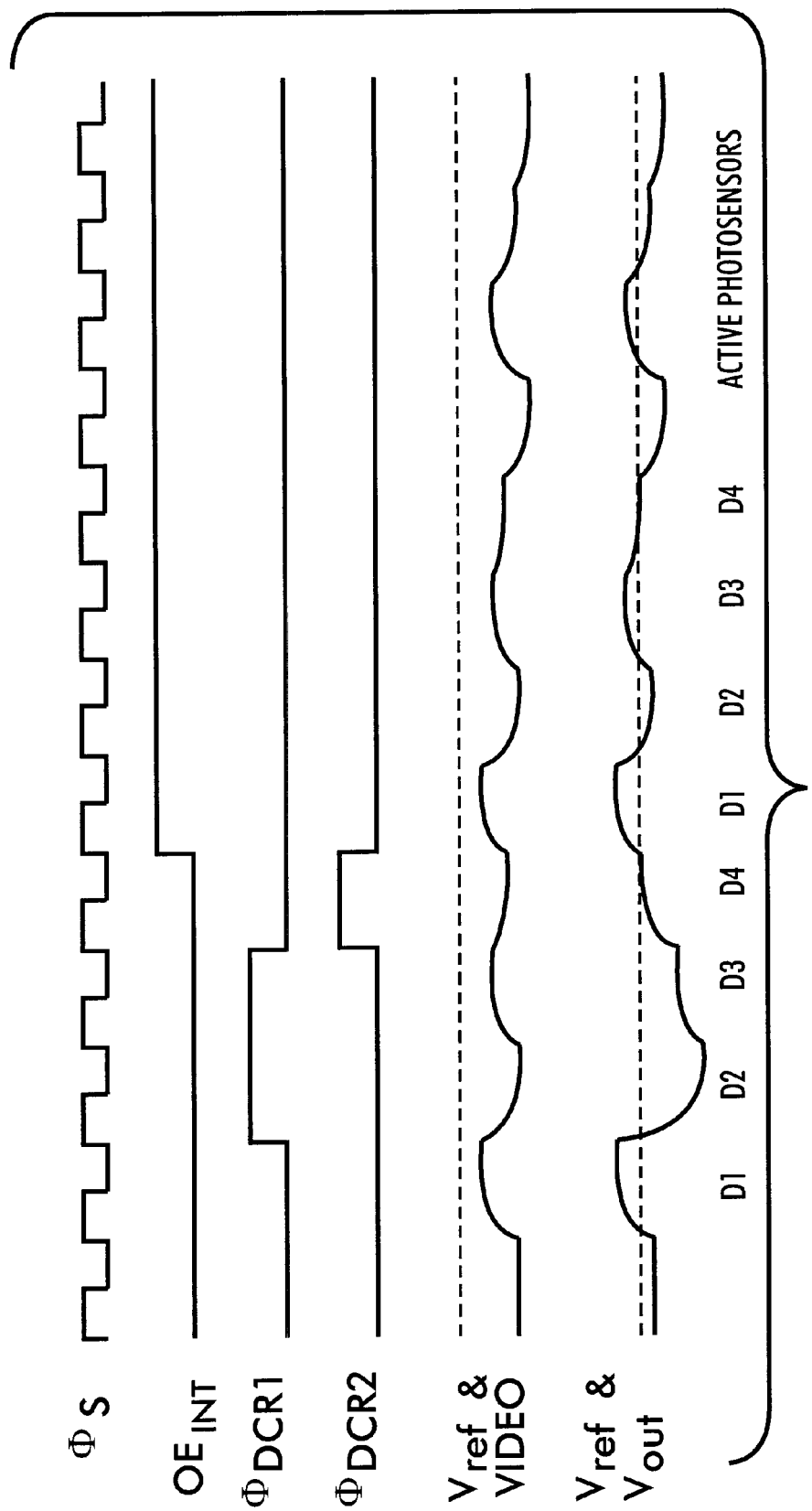
FIG. 4 is a comparative timing diagram of different waveforms for operating the transistors in the circuit of FIG. 3.

FIG. 4 is a set of comparative, simultaneous waveforms indicating the operation of the different switches in the circuit of FIG. 3, during the time in which dark photosensors, such as dark photosensor D2 and dark photosensor D3 of dark photosensors 110, are used to set the offset for the readout of active photosensor 102 for each scan. Waveform $\Phi_s$, at the top of FIG. 4, shows the clock pulses by which video signals from dark photosensors 110 or active photosensors 102 are read out on video line 108. The video line shown in FIG. 4 gives an example of the typical behavior of voltages on video line 108 with each clock cycle $\Phi_s$: as can be seen, the magnitude of the voltage on video line 108 starts on a new tendency (i.e., the voltage moves toward a new plateau, depending on the light intensity on the particular photosensor) with every complete cycle of $\Phi_s$. It will also be noted that even though dark photosensors are shielded from light and are technically supposed to output no voltage, there will inevitably be some sort of DC-level variations from dark photosensors 110.

The waveforms $\Phi_{DCR1}$ and $\Phi_{DCR2}$ in FIG. 4 illustrate the operation of the corresponding switches in the circuit of FIG. 3, such as the switch in RC circuit 140 associated with switching means 144 and bypass switch 148. ("DCR" stands for "DC restore.") When dark photosensor D2 and dark photosensor D3 of dark photosensors 110 are reading out their signals onto video line 108, it can be seen that $\Phi_{DCR1}$ goes high, which connects RC circuit 140 to video line 108, and activates bypass switch 148, which causes the signal on video line 108 to bypass correction capacitor 130. Thus, when dark photosensor D2 and dark photosensor D3 are readout on video line 108, their signals pass through video line 108, through bypass switch 148, and contribute charge to the RC circuit 140.

The RC circuit 140 functions as an averaging circuit which samples the video from both the dark photosensor D2 and dark photosensor D3 with every scan on video line 108. The values of R and C of the RC circuit 140 should be set so that samples of the video signals from dark photosensor D2 and dark photosensor D3 over a relatively large number of scans are accumulated. In other words, R and C should provide a time constant by which the effect of numerous scans of dark photosensors D2 and D3 loaded onto the RC circuit 140 cause the RC circuit 140 to maintain a running average of the outputs of dark photosensors D2 and D3 over a large number of scanlines. For example, if it is desired to maintain a running average of 100 scanlines, then the value of RC should be set equal to 100 times the duration of the sample clock with each scan. Generally, for a practical embodiment of the present invention, the RC should be chosen to sample at least 10 scanlines, and preferably about 100 scanlines, in order to obtain its average dark photosensor signal.

RC circuit 140 thus has the effect, by its accumulation of sample charges over as many as 100 scanlines, of averaging put the random thermal noise of the individual dark photosensors. The noise on the dark photosensors will be reduced by a factor of $(n \times m)_{0.5}$, where n is the number of scanlines averaged, and m is the number of dark photosensors averaged with each scanline.

Returning to FIG. 4, it can be seen, that after the video signals from dark photosensor D2 and dark photosensor D3 are read out on video line 108 to RC circuit 140, $\Phi_{DCR1}$ goes low, thus disconnecting bypass switch 148 and again isolating RC 140 from video line 108. However, simultaneous with $\Phi_{DCR1}$ going low, another clock signal, $\Phi_{DCR2}$, goes high. As can be seen in FIG. 3, the effect of $\Phi_{DCR2}$ going high is to activate switching means 144 and cause switch 134 to apply $V_{REF}$ from source 132 onto video line 108. In effect, the charge from RC circuit 140 is connected, through line 142, to video line 108, so that the charge on RC circuit 140 can be used to affect correction capacitor 130 on one side while $V_{REF}$ is applied to correction capacitor 130 on the other side. The charge on RC circuit 140, which as mentioned above is representative of an average of a large number of samples from dark photosensors D2 and D3 over many scanlines, is used to set correction capacitor 130 prefatory to the readout of the active photosensors on video line 108.

The setting of correction capacitor 130 in the FIG. 3 embodiment is the same as with the FIG. 2 embodiment described above, with the significant difference that, whereas the FIG. 2 embodiment merely used a single reading of a single dark photosensor to set the charge on correction capacitor 130, the circuit of FIG. 3 uses an average reading of two of dark photosensors sampled many times, this average reading being maintained by RC circuit 140.

As mentioned above, one practical problem with the above-described system for using an averaging circuit and a correction capacitor to remove noise from the offset value is that offset correction from the perspective of the photosensor circuitry is to some extent at cross-purposes with offset correction with regard to the downstream image-processing circuitry. According to the present invention, this problem is addressed by providing, with each scanline of reading out dark photosensor signals and active photosensor signals, two readings from the dark photosensors: in the first reading of signals from the dark photosensors, the correction capacitor 130 is bypassed by bypass switch 148 and the dark signals are thus transferred to the averaging circuit 140; in the second reading of the dark pixels, the same dark photosensor signals are read out again, with this time the correction capacitor 130 not bypassed by bypass switch 148; instead of the dark photosensor signals being sent to averaging circuit 140, an "output enable," or OE, transistor switch 150 is activated so that the dark photosensor signals are sent downstream to video circuitry.

In the particular embodiment of FIG. 4, the averaged dark photosensor signals come from dark photosensors D2 and D3 (with reference to FIG. 1 above). As can be seen in the output signals at the bottom of the clocking diagram, with every scanline, the dark photosensors are read out twice before the active pixels (such as 102 in FIG. 1) read out to the video line 108.

Looking at the first set of dark pixel read outs D1–D4 in FIG. 4, it can be seen that for the first readout of dark photosensors, the switch DCR1 is made high for the duration of readouts of: dark photosensors D2 and D3: With reference to the circuit diagram of FIG. 3, this DCR1 going high causes both a bypass of the video signals around correction capacitor 130, and a connection of the dark photosensor signals to averaging circuit 140. Immediately following DCR1 going low, DCR2 goes high: Once again, with reference to FIG. 3, DCR2 going high connects the potential on the capacitor of averaging circuit 140 to the video line 108, and also causes a clamping of a reference voltage $V_{REF}$ from source 132 onto correction capacitor 130. As described above, this combination of readout of the potential from the averaging circuit 140 with the reference voltage 132 creates a correction potential on correction capacitor 130, which in turn is used to correct signals which will be subsequently output from active photosensors on video line 108.

With continuing reference to FIG. 4, it will be noted that, during the first readout of dark photosensors, the line $OE_{INT}$ is low. With reference to FIG. 3, this means that, during the first readout of dark photosensors, transistor 150 effectively cuts off the circuit of FIG. 3 from downstream circuitry, so that the dark photosensor signals on video line 108 are sent only to the averaging circuit 140.

Following the first readout of dark photosensor signals, shown in FIG. 4 bye the second cycle of output signals D1–D4, both DCR1 and DCR2 are low, while the signal on $OE_{INT}$ (output enable transistor 150) is high. With reference to the circuit in FIG. 3, this condition means that the dark photosensor signals read out on video line 108 pass through correction capacitor 130, and are not sent to averaging circuit 140 but through output enable transistor 150 to downstream video circuitry. This particular cycle of dark-photosensor readouts is used for the benefit of calibrating downstream video circuitry.

This is very important, because as can be seen in FIG. 4, the uncorrected "Video" may not be close in value to the DCR reference voltage, "Vref". This means that when D2 and D3 are being flushed through during the average operation, these pixels will not match the DC level of all the other pixels, which are restored (on average) to the reference level, "Vref". FIG. 4 shows the first D2 and D3 readout in "Vout" is not DCR restored. If the first D2 & D3 levels were included in the video sent downstream it could significantly add to the dark nonuniformity of the video and the range needed for pixel to pixel dark level correction.

Figure 5:
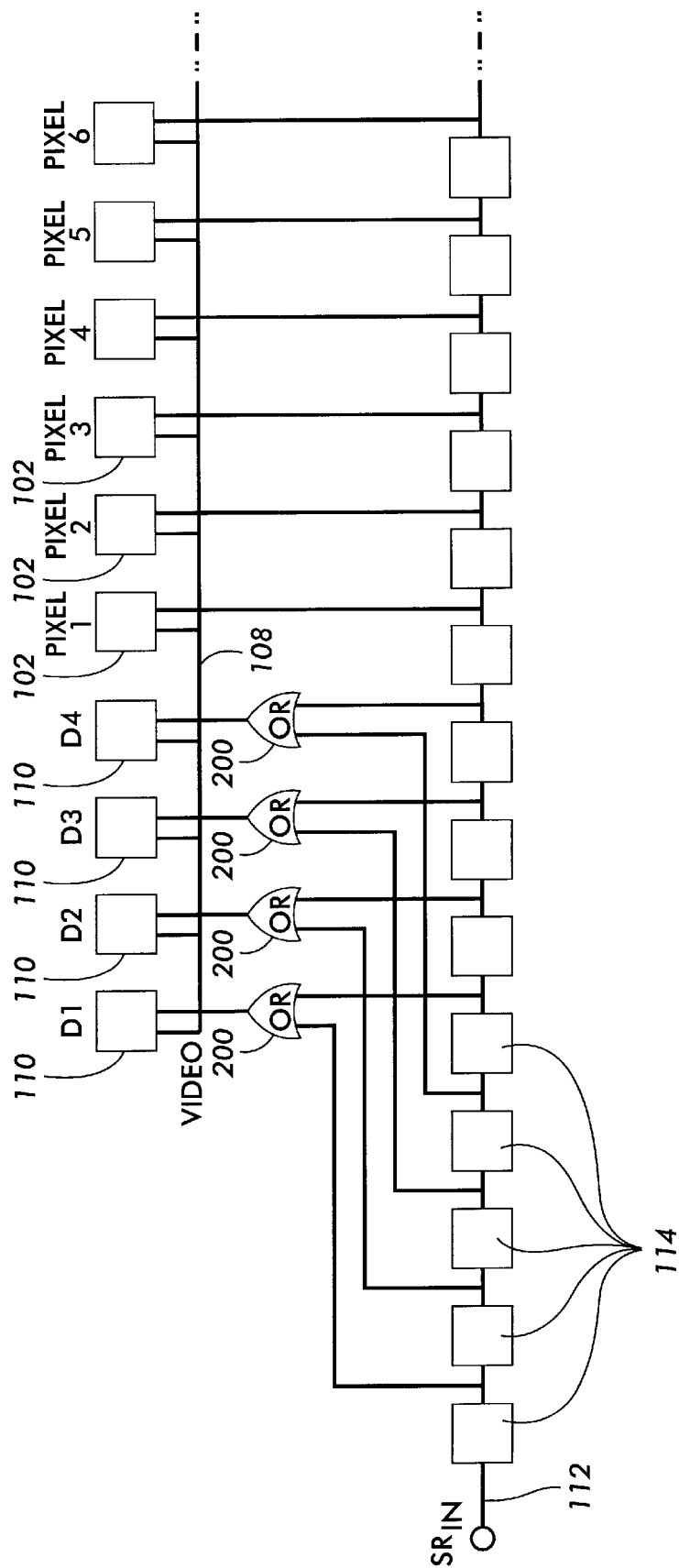
FIGS. 5 and 6 are schematic diagrams showing the basic elements of two different possible embodiments of circuits for enabling the "double readout" of the present invention.
Figure 6:
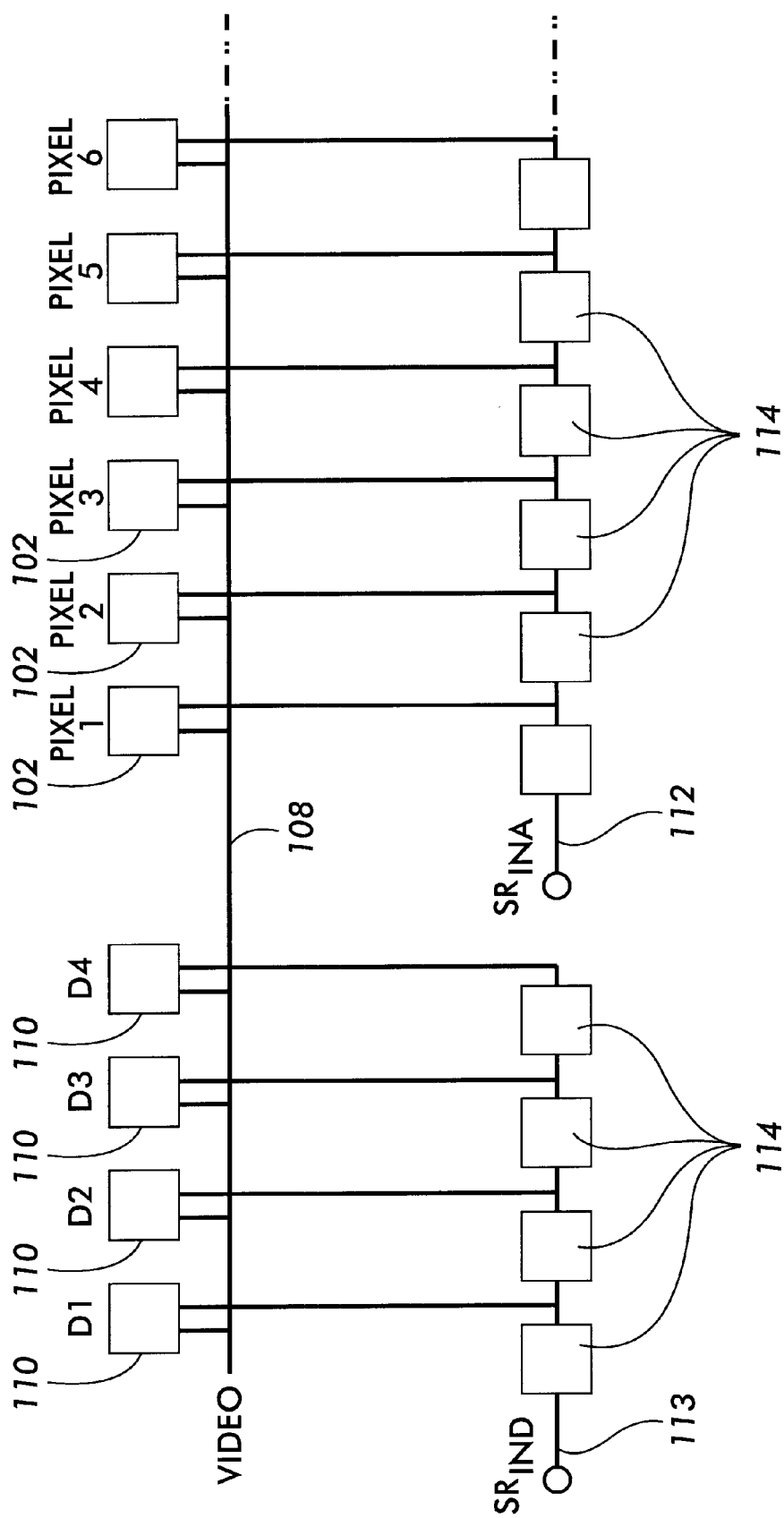

FIGS. 5 and 6 are simplified diagrams showing various embodiments of circuits which carryout the double readout of the dark photosensors. In FIGS. 5 and 6, like numbers such as shown in FIG. 1 above represent like elements. The arrangement of FIG. 5 shows a modification of the shift register relationship shown in FIG. 1, where there is provided, along shift register line 112, two sets of shift register stages for each of the dark photosensors 110. As can be seen in the FIGURE, the shift register input to each dark photosensor 110 is connected through an OR gate 200 to two separate shift register stages 114. As a digital "1" passes along shift register line 112 to the various shift register stages 114, it can be seen that the double set of shift register stages 114 will, in combination with the OR gate for each dark pixel 110, cause a readout of a signal from the dark photosensor 110 twice, whenever a shift register stage interacts with the OR gate associated with a particular dark photosensor 110. After each dark photosensor is read out twice in the manner shown, then each active photosensor is read out once.

FIG. 6 shows another possible implementation to enable the double readout system of the present invention. Here, the dark photodiodes D1–D4 share the video line 108 with the active photosensors 102, but the dark photosensors 110 are controlled by a separate, small shift register, forming a shift register line 113, which is distinct from the shift register line 112 used for the active photosensors 102. By controlling the shift register stages 114 on shift register line 113, the dark photosensors 110 can be read out essentially independently of the readout of the active photosensors 102.

It will be noted that certain basic principles relating to the present invention, in particular using two readouts of a set of photosensors, with one readout going to an averaging circuit and the other readout going to downstream circuitry, can be applied to other basic designs of an active photosensor array. For example, it is known in the art to provide a calibration system which does not use dark photosensors at all, but which rather takes an average of all active photosensors as a basis for offset correction. In such a case, the active photosensors could be read out first to an averaging circuit and then to downstream circuitry, such as in the present invention. If a design is chosen in which offset correction, regardless of the signal source, is performed digitally by downstream circuitry, the use of an averaging circuit such as 140 may not be necessary; similarly, the use of a series capacitor for correction, such as correction capacitor 130, could be replaced by other means for correcting dark or active photosensor signals being read out on the video line. Also, although the below claim language occasionally refers to reading out dark photosensor signals "a first time" and "a second time", this language should not be construed necessarily to imply a sequence of operations, or that one readout should immediately follow the other.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A photosensitive device, comprising:
   a set of photosensors, each photosensor outputting a voltage signal representative of light intensity thereon;

a video line, adapted to receive voltage signals from the set of photosensors;

a correction capacitor associated with the video line, the correction capacitor adapted to retain a correction charge thereon to influence the voltage signals from the photosensors;

a bypass switch for selectably causing a signal on the video line to bypass the correction capacitor; and means for reading a signal from a photosensor a first time with the correction capacitor bypassed by the bypass switch, and reading a signal from the photosensor a second time through the correction capacitor.

2. The device of claim 1, the set of photosensors including:

a set of active photosensors, each active photosensor outputting a voltage signal representative of light intensity thereon, a dark photosensor, the dark photosensor being adapted to receive no light thereon;

and wherein the video line receives voltage signals in sequence from the dark photosensor and each active photosensor of the set of photosensors.

3. The device of claim 1, said reading means including means for reading a signal from the dark photosensor a first time with the correction capacitor bypassed by the bypass switch, and reading a signal from the dark photosensor a second time through the correction capacitor.

4. The device of claim 1, further comprising means for applying a reference signal to the video line.

5. The device of claim 4, wherein the reading means applies the reference signal to the video line following bypassing the correction capacitor.

6. The device of claim 1, further comprising an averaging circuit in parallel with the video line.

7. The device of claim 6, wherein the reading means reads a signal from the video line to the averaging circuit.

8. The device of claim 7, wherein the reading means reads a signal from the video line to the averaging circuit when the bypass switch bypasses the correction capacitor.

9. The device of claim 1, further comprising means for closing the video line from downstream circuitry when the determining means reads a signal from the photosensor to the averaging circuit.

10. A photosensitive device, comprising:

a set of photosensors, each photosensor outputting a voltage signal representative of light intensity thereon;

a video line, adapted to receive voltage signals from the set of photosensors;

an averaging circuit in parallel with the video line, means for reading, within a cycle of operation, a signal from a photosensor a first time to the averaging circuit, and reading a signal from the photosensor a second time to external circuitry and not reading the signal to the averaging circuit.

11. The device of claim 10, further comprising:

a correction capacitor associated with the video line, the correction capacitor adapted to retain a correction charge thereon to influence the voltage signals from the active photosensors;

a bypass switch for selectably causing a signal on the video line to bypass the correction capacitor; and means for reading a signal from a photosensor the first time with the correction capacitor bypassed by the bypass switch, and reading a signal from the photosensor the second time through the correction capacitor.

12. The device of claim 10, the set of photosensors including:

a set of active photosensors, each active photosensor outputting a voltage signal representative of light intensity thereon, a dark photosensor, the dark photosensor being adapted to receive no light thereon;

and wherein the reading means causes, with a cycle of operation, voltage signals to be read from the dark photosensor said first time and said second time and from each active photosensor of the set of photosensors.

13. A method of controlling a photosensitive device, the photosensitive device comprising:

a set of active photosensors, each active photosensor outputting a voltage signal representative of light intensity thereon, a dark photosensor, the dark photosensor being adapted to receive no light thereon, a video line, adapted to receive voltage signals in sequence from the dark photosensor and each active photosensor of the set of photosensors, and a correction capacitor associated with the video line, the correction capacitor adapted to retain a correction charge thereon to influence the voltage signals from the active photosensors, the method comprising the steps of:

reading a signal from the dark photosensor a first time, not reading the signal through the correction capacitor; and reading a signal from the dark photosensor a second time through the correction capacitor.

14. The method of claim 13, further comprising the step of:

reading signals from the set of active photosensors following reading the signal from the dark photosensor said first time and reading the signal from the dark photosensor said second time.

15. The method of claim 13, further comprising the step of:

for each of a plurality of scanlines for recording an image, reading signals from the set of active photosensors following reading the signal from the dark photosensor said first time and reading the signal from the dark photosensor said second time.

16. The method of claim 13, the step of reading a signal from the dark photosensor the first time including reading a signal from the dark photosensor a first time while bypassing the correction capacitor.

17. The method of claim 13, the step of reading a signal from the dark photosensor the first time including reading a signal from the dark photosensor while closing the video line from downstream circuitry.

18. The method of claim 13, the step of reading a signal from the dark photosensor the first time including reading a signal from the dark photosensor while directing the signal to an averaging circuit in parallel with the video line.

19. A method of operating a photosensitive device, the photosensitive device comprising:

a set of photosensors, each photosensor outputting a voltage signal representative of light intensity thereon, a video line, adapted to receive voltage signals from the set of photosensors, and an averaging circuit in parallel with the video line;

the method comprising the steps of within a cycle of operation, reading a signal from a photosensor a first time to the averaging circuit, and reading a signal from the photosensor a second time to external circuitry and not reading the signal to the averaging circuit.

20. The method of claim 19, the set of photosensors including:

a set of active photosensors, each active photosensor outputting a voltage signal representative of light intensity thereon, a dark photosensor, the dark photosensor being adapted to receive no light thereon; and wherein said reading step includes reading, with a cycle of operation, voltage signals from the dark photosensor said first time and said second time and from each active photosensor of the set of photosensors.

* * * * *